(12) United States Patent
Fukasawa (10) Patent No.: US 9,104,959 B2
(45) Date of Patent: Aug. 11, 2015

(54) IMAGE FORMING APPARATUS WITH CONTINUOUS PAPER FEEDING, AND IMAGE FORMING METHOD

(71) Applicant: KYOCERA Document Solutions Inc., Osaka (JP)

(72) Inventor: Yuki Fukasawa, Osaka (JP)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 14/447,759

(22) Filed: Jul. 31, 2014

(65) Prior Publication Data

US 2015/0036190 A1 Feb. 5, 2015

(30) Foreign Application Priority Data

Jul. 31, 2013 (JP) ................................. 2013-159379
May 30, 2014 (JP) ................................. 2014-112620

(51) Int. Cl.
*G06F 3/12* (2006.01)
*G06K 15/00* (2006.01)
*G06K 15/02* (2006.01)
*G03G 15/00* (2006.01)

(52) U.S. Cl.
CPC ........ *G06K 15/4065* (2013.01); *G03G 15/6511* (2013.01); *G03G 15/6564* (2013.01); *G06K 15/1806* (2013.01); *G06K 15/1894* (2013.01)

(58) Field of Classification Search
None
See application file for complete search history.

(56) References Cited

U.S. PATENT DOCUMENTS 7,268,912 B2 * 9/2007 Murata ........................... 358/1.5
7,535,589 B2 * 5/2009 Toda ............................. 358/1.15

FOREIGN PATENT DOCUMENTS

JP 2004-262026 A 9/2004
JP 2004262026 A * 9/2004 ................. B41J 5/30

* cited by examiner

*Primary Examiner* — Ashish K Thomas
*Assistant Examiner* — Neil R McLean
(74) *Attorney, Agent, or Firm* — McDonnell Boehnen Hulbert & Berghoff LLP (57) ABSTRACT

An image forming apparatus continuously performs primary paper feeding in which paper is transported from a paper feeding roller to a resist position roller and secondary paper feeding in which the paper is transported from the resist position roller to an ejection roller while not stopping the resist position roller. The image forming apparatus divides image data into pieces of band data, stores the pieces of band data, calculates the number of specific bands corresponding to an in-advance paper feeding timing corresponding to the paper size and the paper orientation, and outputs an in-advance paper feeding timing notice when image process is completed up to the number of specific bands.

11 Claims, 4 Drawing Sheets

Fig. 4

IMAGE FORMING APPARATUS WITH CONTINUOUS PAPER FEEDING, AND IMAGE FORMING METHOD

INCORPORATION BY REFERENCE

This application is based upon, and claims priority to corresponding Japanese Patent Application No. 2013-159379, filed in the Japan Patent Office on Jul. 31, 2013, and Japanese Priority Patent Application No. 2014-112620 based on Japanese Patent Application No. 2013-159379, filed in the Japan Patent Office on May 30, 2014, the entire contents of which are incorporated herein by reference.

FIELD

The present disclosure relates to an image forming apparatus that performs image formation with continuous paper feeding, and an image forming method.

BACKGROUND

When receiving a print request, a typical image forming apparatus such as a printer or a multifunction peripheral (MFP) executes, in advance of printing, an operation that begins supplying paper from a paper feeding tray. Without considering timing, the typical image forming apparatus might begin supplying paper from the paper feeding tray prior to completing a scan operation or the like. The typical image forming apparatus includes a resist roller that prevents paper from advancing to subsequent rollers configured to transfer toner representing a scanned image or the like onto the paper under certain circumstances. In some examples, the paper may arrive at a toner roller within the typical image forming apparatus before a scanning operation completes, and a resist roller in the typical image forming apparatus is controlled to prevent the paper from continuing to the toner roller until the scanning operation exist. Thus, the typical image forming apparatus requires a controllable resist roller to control the timing in which paper is fed through to various rollers such as a toner roller.

Existing image forming apparatuses can calculate a timing in which to feed the paper to the rollers based on the amount of data included in a print instruction and data sent to the image forming apparatus, along with certain aspects of the intermediate language of the sent data.

In the above-described image forming apparatus, it is necessary to stop the paper immediately before the toner image is transferred to the paper. The stopping of the paper is typically performed by a resist roller serving as one of transport rollers for transporting the paper.

SUMMARY

In a low-cost image forming apparatus where a motor for a resist roller is omitted and paper does not stop at a resist roller position even if a roller exists at the resist roller position, it has been difficult to adjust the timing at which the paper is to arrive at a position at which the toner image is transferred and the timing at which the transfer of the toner image may be started. The present disclosure relates to the low-cost image forming apparatus that performs the toner image formation while not causing paper to stop at a resist roller position, and an image forming method.

In one embodiment, an image forming apparatus may continuously perform primary paper feeding in which paper is transported from a paper feeding roller to a resist position roller and secondary paper feeding in which the paper is transported from the resist position roller to an ejection roller while not stopping the resist position roller. The image forming apparatus includes an operation unit, a storage unit, a print control processing unit, a data processing unit, an image processing unit, a drive processing unit. The operation unit may receive an input and provide a paper size, a paper orientation, and a print request.

The print control processing unit outputs a request to start loading a page responsive the operation unit providing the paper size, the paper orientation, and the print request. The print control processing unit is also provides a request to eject image data in response to an in-advance paper feeding timing notice being provided by a unit of the image forming apparatus. The print control processing unit further provides a paper feeding request in response to a completion notice of ejection preparation being provided by a unit of the image forming apparatus.

The data processing unit, responsive to the print control processing unit providing the request to start loading a page, performs a set of operations. The operations include dividing image data into pieces of band data. The operations also include causing the storage unit to store the pieces of band data. The operations further include calculating a number of specific bands corresponding to an in-advance paper feeding timing in accordance with the paper size and the paper orientation. Additionally, the operations include outputting an in-advance paper feeding timing notice to the print control processing unit when image process is completed up to the number of specific bands.

The image processing unit, responsive to the print control processing unit providing the request to eject image data, performs a set of operations. The operations include starting image data ejection preparation. The operations also include providing, to the print control processing unit, a completion notice of ejection preparation for the image data to the print control processing unit in response to the image data ejection preparation being completed. The operations further include retrieving pieces of band data saved in the storage unit. Additionally, the operations include generating image data based on the pieces of band data.

The drive processing unit, responsive to the print control processing unit providing the paper feeding request, outputs to the image processing unit a vertical synchronization signal that causes a timing of transport of the paper by the paper feeding roller to coincide with a timing of ejection of image data.

Additional features and advantages are described herein, and will be apparent from the following Detailed Description and the figures.

BRIEF DESCRIPTION OF FIGURES

All drawings are intended to illustrate some aspects and examples of the present disclosure. The drawings described are only schematic and are non-limiting, and are not necessarily drawn to scale.

DETAILED DESCRIPTION

Various embodiments are described below with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out one or more of the functions described herein.

Figure 1:
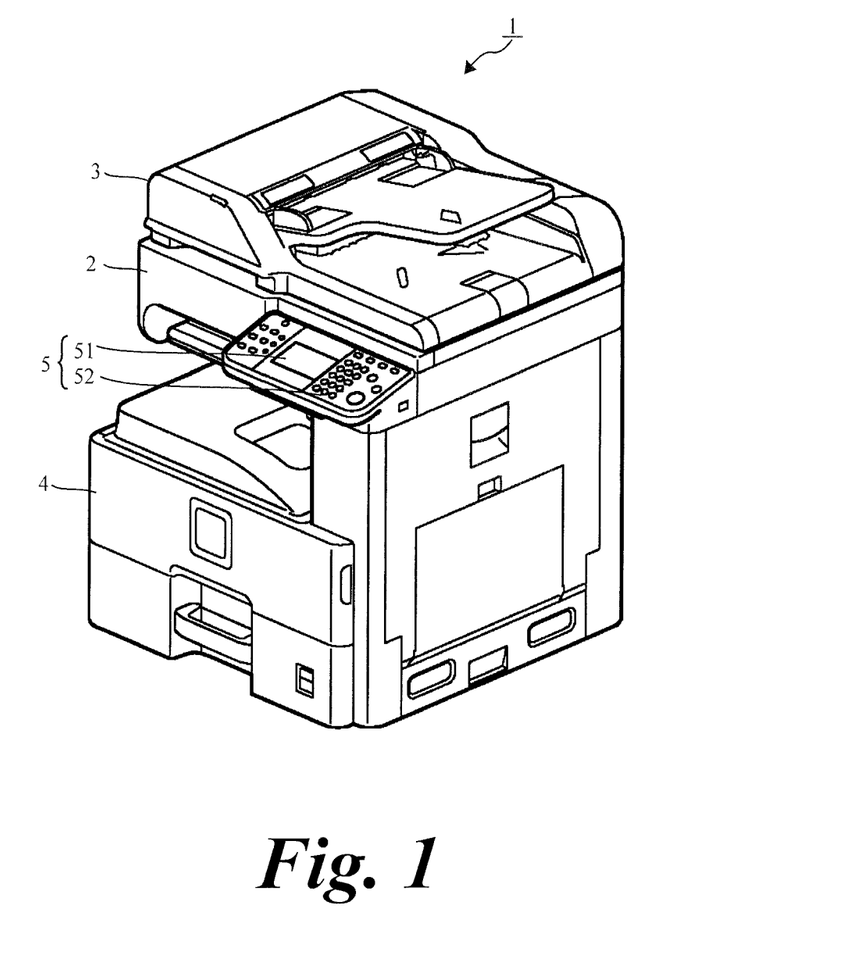
FIG. 1 is a schematic diagram illustrating an appearance of an image forming apparatus according to an embodiment of the present disclosure.

FIG. 1 is a schematic diagram illustrating the appearance of an image forming apparatus 1 according to an embodiment of the present disclosure. The image forming apparatus 1 includes a manuscript reading unit 2, a manuscript feeding unit 3, a main body portion 4, and an operation unit 5. The manuscript reading unit 2 is arranged above the main body portion 4, and the manuscript feeding unit 3 is arranged on the manuscript reading unit 2.

FIG. 1 also depicts operation unit 5 being placed on a front side of the image forming apparatus 1. The operation unit 5 may be configured to receive input corresponding to operation instructions and change settings of the image forming apparatus 1. In the operation unit 5, a liquid crystal display unit 51 and an operation button 52 are provided. By operating the operation unit 5 and inputting an instruction, a user may select various settings for the image forming apparatus 1, and may also cause various kinds of functions such as image formation to be executed. The liquid crystal display unit 51 is able to provide an indication of the state of the image forming apparatus 1, display an image formation state and the number of print copies, and function as a touch panel that allows the user to select functions such as double-sided printing and monochrome inversion and perform various kinds of settings such as a magnification setting and a density setting. Operation button 52 may function as a start button for instructing starting of image formation, a stop/clear button for instructing stopping of the image formation, a reset button used at the time of putting various kinds of settings of the image forming apparatus 1 into default states, and a numerical keypad, among other possible button functions.

Figure 2:
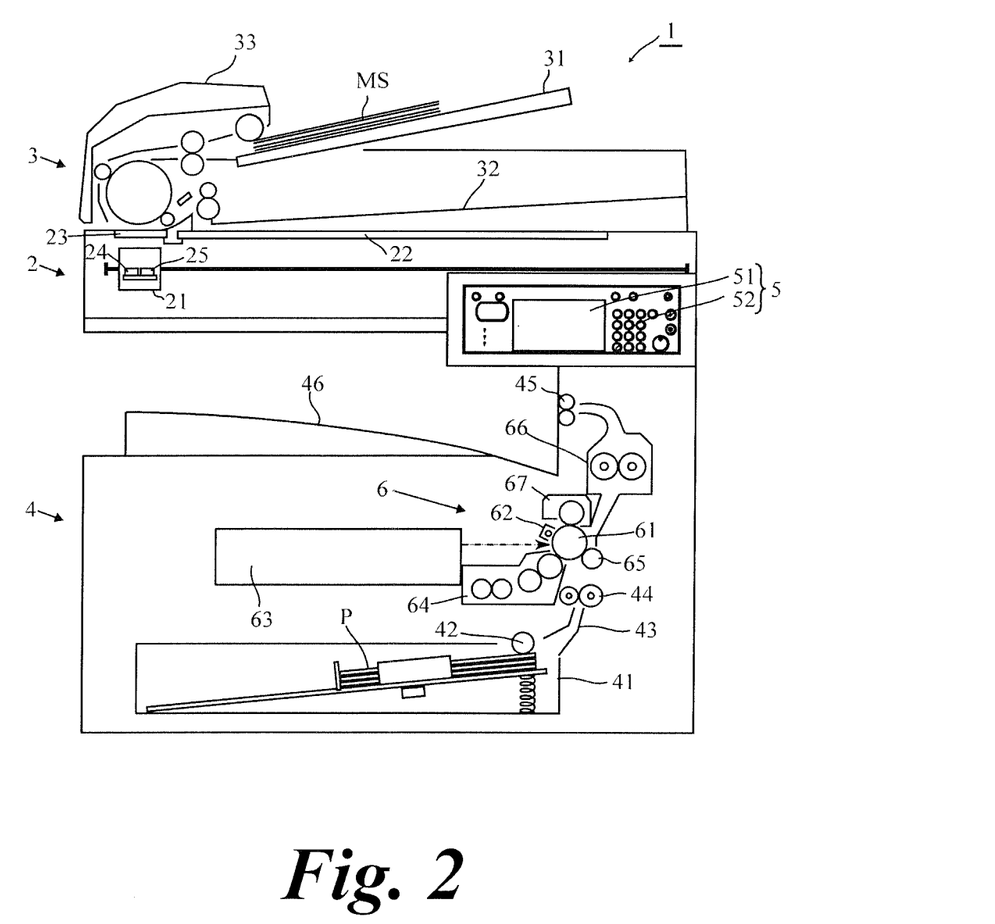
FIG. 2 is a schematic diagram illustrating an internal configuration of the image forming apparatus.

FIG. 2 is a schematic diagram illustrating the internal configuration of the image forming apparatus 1. The manuscript reading unit 2 includes a scanner 21, a platen glass 22, and a manuscript reading slit 23. The scanner 21 includes a light source 24 utilizing a light emitting diode (LED), and a light receiving unit 25 that includes a charge coupled device (CCD) line sensor, a complementary metal oxide semiconductor (CMOS) line sensor, or the like. The scanner 21 is configured to be movable in the transport direction of a manuscript MS by the manuscript feeding unit 3. The manuscript reading slit 23 is a slit formed in a direction perpendicular to the transport direction of the manuscript MS by the manuscript feeding unit 3. The manuscript MS may include any number of papers, which may be formed in a stack as depicted in FIG. 2.

The manuscript feeding unit 3 includes a manuscript placing unit 31, a manuscript ejection unit 32, and a manuscript transport mechanism 33. Each sheet of the manuscript MS set in the manuscript placing unit 31 is sequentially fed in and transported to a position facing the manuscript reading slit 23, by the manuscript transport mechanism 33. Then, the manuscript MS is ejected by the manuscript ejection unit 32. In addition, the manuscript feeding unit 3 and the manuscript reading unit 2 are connected to each other by a hinge mechanism on the far side of the image forming apparatus 1, and the manuscript feeding unit 3 functions as a platen cover for opening and closing the upper surface of the platen glass 22. By opening the manuscript feeding unit 3 upward, the upper surface of the platen glass 22 is exposed, thus allowing the manuscript MS to be set on the platen glass 22.

When the operation button 52 in the operation unit 5 instructs the image forming apparatus to read the manuscript MS in a state in which the manuscript MS is not set in the manuscript placing unit 31 or in a state in which the manuscript feeding unit 3 (platen cover) is opened, the manuscript MS set on the platen glass 22 is read. Note that reading a page of the manuscript may involve a scanning operation, in which an image of the page is captured and may be stored as data representative of the scanned image. In a case of reading the manuscript MS placed on the platen glass 22, the scanner 21 is moved to a position facing the platen glass 22, reads the manuscript MS set on the platen glass 22 while scanning from a sub-scanning direction reference line B in a sub-scanning direction perpendicular to a main scanning direction, acquires image data, and outputs the acquired image data to the main body portion 4.

When the operation button 52 in the operation unit 5 instructs the image forming apparatus to read the manuscript MS set in the manuscript placing unit 31, the manuscript MS transported by the manuscript feeding unit 3 is read. In some configurations, the manuscript MS is set in the manuscript placing unit 31 with the front surface thereof (a surface for reading a manuscript image) up. In addition, the manuscript MS set in the manuscript placing unit 31 is transported by the manuscript feeding unit 3 from the left side, and the front surface of the manuscript MS is guided to a position facing the manuscript reading slit 23. In addition, in a case of reading the manuscript MS transported by the manuscript feeding unit 3, the scanner 21 is moved to a position facing the manuscript reading slit 23, reads the manuscript MS via the manuscript reading slit 23 in synchronization with a transport operation performed by the manuscript feeding unit 3, acquires image data, and outputs the acquired image data to the main body portion 4.

The main body portion 4 includes a recording unit 6, and further includes a paper feeding unit 41, a paper feeding roller 42, a paper transport path 43, a resist position roller 44, and an ejection roller 45. As described above, while the typical resist roller is independently controlled by a drive unit such as a motor, the drive unit is omitted to reduce costs in the present disclosure. In other words, since having no resist function for specifying the timing of paper feeding, a roller located at a resist roller position in the present disclosure is referred to as the "resist position roller" 44. In addition, the resist position roller 44 is directly connected to, for example, the paper feeding roller 42, and is controlled, along with the paper feeding roller 42, by a motor for driving the paper feeding roller 42. The paper feeding unit 41 is a paper feeding cassette in which a plurality of sheets of paper P are housed, and the paper feeding roller 42 feeds the paper P sheet by sheet from the paper feeding unit 41 to the paper transport path 43. The paper P fed to the paper transport path 43 by the paper feeding roller 42 is transported to the recording unit 6 by the resist position roller 44. The resist position roller 44 transports the paper P so as to cause the leading end of the sheet of the paper P supplied from the paper feeding cassette and the leading end of an image read from the manuscript to coincide with each other. In addition, the paper P subjected to recording by the recording unit 6 is ejected by the ejection roller 45 into an ejection space 46 formed between the manuscript reading unit 2 and the main body portion 4. In this way, the paper feeding roller 42, the resist position roller 44, and the ejection roller 45 function as a transport unit for the paper P.

The recording unit 6 includes a photoreceptor drum 61, a charging unit 62, an exposure unit 63, an image forming unit 64, a transfer unit 65, a fixing unit 66, and a cleaning unit 67. The exposure unit 63 is an optical unit including a laser device, a mirror, and so forth, exposes the photoreceptor drum 61 evenly charged by the charging unit 62, by outputting laser light based on image data to the photoconductor drum 61, and forms an electrostatic latent image on the surface of the photoconductor drum 61. The image forming unit 64 is a development unit that develops the electrostatic latent image formed on the photoconductor drum 61 using toner, and forms a toner image based on the electrostatic latent image, on the photoconductor drum 61. The transfer unit 65 transfers, to the paper P, the toner image formed on the photoconductor drum 61 by the image forming unit 64. The fixing unit 66 heats the paper P to which the toner image is transferred by the transfer unit 65, and fixes the toner image to the paper P. In addition, toner remaining on the photoreceptor drum 61 is removed by the cleaning unit 67.

Figure 3:
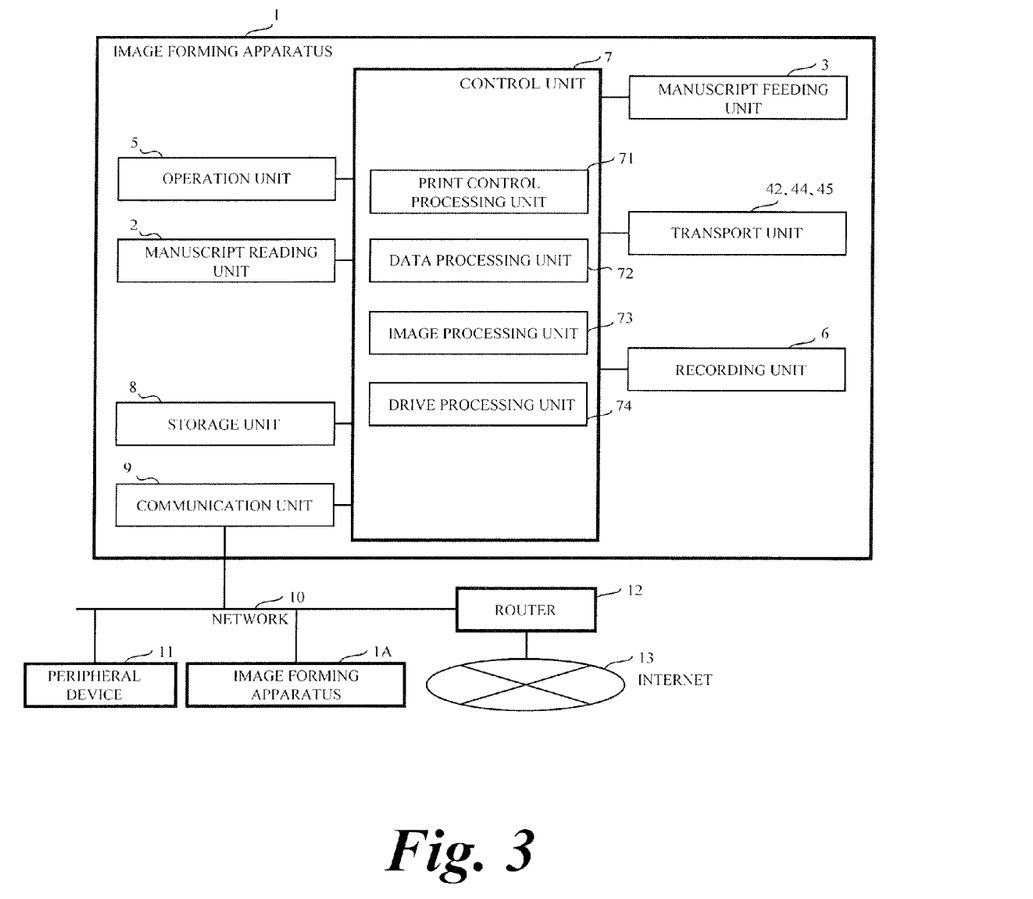
FIG. 3 is a schematic diagram illustrating a functional block configuration of the image forming apparatus.

FIG. 3 is a schematic diagram illustrating the functional block configuration of the image forming apparatus 1. The manuscript reading unit 2, the manuscript feeding unit 3, the transport unit (which includes the paper feeding roller 42, the resist position roller 44, and the ejection roller 45), the operation unit 5, the recording unit 6, a storage unit 8, and a communication unit 9 are connected to a control unit 7. The units connected to the control unit are subjected to operation control by the control unit 7. The control unit 7 includes a print control processing unit 71, a data processing unit 72, an image processing unit 73, and a drive processing unit 74.

The control unit 7 may be any information processing unit such as a microcomputer including a read only memory (ROM), a random access memory (RAM), and a processor, among others. In the ROM, a control program for performing the operation control of the image forming apparatus 1 is stored. The control unit 7 reads the control program stored in the ROM, and causes the control program to be deployed in the RAM. Accordingly, the control unit 7 manages the control of the entire device in accordance with instruction information input from the operation unit 5.

The print control processing unit 71 receives a print request input from the operation unit 5, and performs the control of the data processing unit 72, the image processing unit 73, and the drive processing unit 74.

The data processing unit 72 divides, into substantially strip shapes, the data of one page of the manuscript MS read by the scanner 21 into multiple portions of data. In some embodiments, the portions of data represent strips or bands of the page perpendicular to the direction in which the page is fed through the image forming apparatus 1. The data processing unit 72 also performs image processing on band data of each of the strip shapes, and performs page load for saving the image data of the manuscript MS in the storage unit 8.

The image processing unit 73 generates image data, based on the information of the band data, and performs ejection of image data.

The drive processing unit 74 controls driving or stopping of the paper feeding roller 42 and the ejection roller 45 in the transport unit, and controls heating of the fixing unit 66. In addition, as described above, the resist position roller 44 is not directly subjected to drive or stop control by the drive processing unit 74. The resist position roller 44 is also directly connected to, for example, the paper feeding roller 42 and indirectly subjected to control from the paper feeding roller 42.

Details of the processing operations of the print control processing unit 71, the data processing unit 72, the image processing unit 73, and the drive processing unit 74 will be described later in more detail.

The storage unit 8 is a storage unit such as a semiconductor memory or a hard disk drive (HDD). In addition, in the storage unit 8, the image data of the manuscript MS read by the scanner 21 is stored and various kinds of management information are stored.

The communication unit 9 has a function of transmitting and receiving various kinds of data to and from a peripheral device 11 such as a personal computer and another image forming apparatus 1a via a network 10 such as a LAN. In addition, the communication unit 9 is configured so as to be connectable to the Internet 13 via the network 10 and a router 12. In addition, the communication unit 9 has a function of transmitting and receiving various kinds of data to and from various kinds of communication devices connected to the Internet 13.

Figure 4:
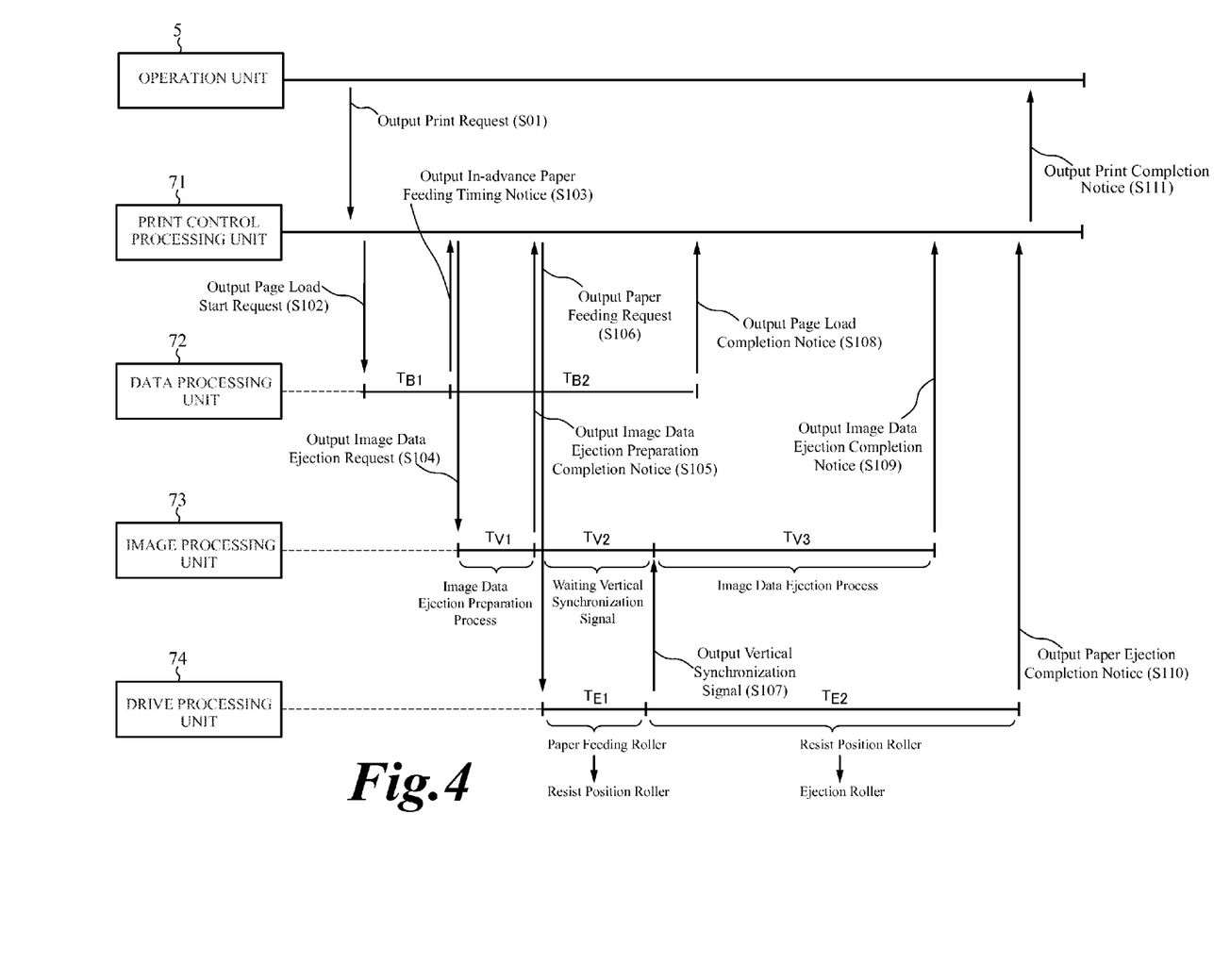
FIG. 4 is a sequence diagram illustrating a flow of a printing procedure in the image forming apparatus.

FIG. 4 is a sequence diagram illustrating a flow of a printing procedure in the image forming apparatus 1. With reference to FIG. 4, the flow of the printing procedure will be described for the image forming apparatus 1 that lacks direct control of the resist roller position. In other words, primary paper feeding (from the paper feeding roller 42 to the resist position roller 44) and secondary paper feeding (from the resist position roller 44 to the ejection roller 45) are continuously performed.

In a step S101, the user sets the manuscript MS in the manuscript placing unit 31 in the manuscript feeding unit 3, inputs the paper size of the manuscript MS, such as A4 or A3, and a vertical or horizontal paper orientation, using the operation button 52 in the operation unit 5, and instructs starting of printing. Then, as illustrated in FIG. 4, the operation unit 5 receives the start of printing, and outputs a print request to the print control processing unit 71 in the control unit 7.

In a step S102, when the print control processing unit 71 inputs the paper size, the paper orientation, and the print request from the operation unit 5, the print control processing unit 71 outputs a page load start request to the data processing unit 72.

In a step S103, when the page load start request is received, the data processing unit 72 divides the data of the manuscript MS read by the scanner 21 into pieces of band data and stores the pieces of band data in the storage unit 8. In addition, when the data processing unit 72 performs image process on each of the pieces of band data and completes the image process up to the number of bands corresponding to a timing at which the paper P is fed from the paper feeding unit 41 in advance (referred to as an "in-advance paper feeding timing" hereinafter), the data processing unit 72 outputs an in-advance paper feeding timing notice to the print control processing unit 71. In addition, a method for calculating the number of in-advance bands N will be described in the in-advance paper feeding timing calculation method mentioned below. The time period from the inputting of the page load start request to the outputting of the in-advance paper feeding timing notice in the data processing unit 72 is defined as $T_{B1}$.

In a step S104, when the in-advance paper feeding timing notice is received, the print control processing unit 71 outputs an image data ejection request to the image processing unit 73.

In a step S105, when the image data ejection request is received, the image processing unit 73 performs a preparation for image data ejection, performed before generation of image data. In addition, when the preparation is completed, the image processing unit 73 outputs an image data ejection preparation completion notice to the print control processing unit 71. When completing the preparation for image data ejection, the image processing unit 73 retrieves, in turn, the pieces of band data stored in the storage unit 8, and generates image data. The time period from the inputting of the image data ejection request to the outputting of the image data ejection preparation completion notice in the image processing unit 73 is defined as $T_{V1}$.

In a step S106, when the image data ejection preparation completion notice is received, the print control processing unit 71 outputs a paper feeding request to the drive processing unit 74.

In a step S107, when the paper feeding request is received, the drive processing unit 74 outputs, to the image processing unit 73, a vertical synchronization signal for causing the timing of the transport of the paper P by the paper feeding roller 42 and the timing of the ejection of image data to coincide with each other. The time period from the inputting of the paper feeding request to the outputting of the vertical synchronization signal in the drive processing unit 74 is defined as $T_{E1}$. In addition, $T_{E1}$ is the time taken for the paper P to be transported from the paper feeding roller 42 to the resist position roller 44.

In a step S108, the data processing unit 72 outputs, to the print control processing unit 71, a page load completion notice for conveying that the image process of the band data of the entire page is completed. The time period from the outputting of the in-advance paper feeding timing notice to the outputting of the page load completion notice in the data processing unit 72 is defined as $T_{B2}$.

In a step S109, when the vertical synchronization signal output from the drive processing unit 74 in the step S107 is received, the image processing unit 73 performs ejection of image data in accordance with the vertical synchronization signal. In addition, when completing the ejection of image data for all the pieces of band data, the image processing unit 73 outputs an image data ejection completion notice to the print control processing unit 71. In the image processing unit 73, the time period from the outputting of the image data ejection preparation completion notice to the inputting of the vertical synchronization signal is defined as $T_{V2}$ and the time period from the inputting of the vertical synchronization signal to the outputting of the image data ejection completion notice is defined as $T_{V3}$.

In a step S110, when ejection of the paper P is completed by the ejection roller 45, the drive processing unit 74 outputs a paper ejection completion notice to the print control processing unit 71. The time period from the outputting of the vertical synchronization signal to the outputting of the paper ejection completion notice in the drive processing unit 74 is defined as $T_{E2}$. In addition, $T_{E2}$ is the time taken for the paper P to be transported from the resist position roller 44 to the ejection roller 45.

In a step S111, when the page load completion notice, the image data ejection completion notice, and the paper ejection completion notice are received in turn from the data processing unit 72, the image processing unit 73, and the drive processing unit 74, respectively, the print control processing unit 71 outputs a print completion notice to, for example, the operation unit 5. The operation unit 5 displays the print completion notice on the liquid crystal display unit 51, and hence, the user is notified of the print completion.

In such a flow of the printing procedure as described above, in the page load process performed by the data processing unit 72, the print control processing unit 71 makes a request to the image processing unit 73 for ejection of image data, and also makes a paper feeding request to the drive processing unit 74. In other words, the image processing unit 73 and the drive processing unit 74 do not operate when the data processing unit 72 completes the page load, but instead operate in advance as described above. Accordingly, it becomes possible to reduce the time taken to make a duplicate copy of a first sheet of a manuscript (referred to as a "first copy" hereinafter) under a predetermined condition when printing the manuscript. The continuous operation of the primary paper feeding (from the paper feeding roller 42 to the resist position roller 44) and the secondary paper feeding (from the resist position roller 44 to the ejection roller 45) may be referred to hereinafter as the "continuous feeding operation."

Next, using $T_{B1}$, $T_{B2}$, $T_{V1}$, $T_{V2}$, $T_{V3}$, $T_{E1}$, and $T_{E2}$ illustrated in FIG. 4, the in-advance paper feeding timing calculation method for the continuous feeding operation will now be described.

First, $T_E$ is calculated based on Expression (1). $T_E$ represents a distance from the paper feeding roller 42 to the ejection roller 45 divided by a linear velocity.

$$T_E = T_{E1} + T_{E2} \qquad \text{Expression (1)}$$

Next, $T_V$ is calculated based on Expression (2). $T_V$ represents the time period from the image data ejection request to the image data ejection completion notice.

$$T_V = T_{V1} + T_{V2} + T_{V3} \qquad \text{Expression (2)}$$

Next, $T_{B2}$ is calculated based on Expression (3). $T_{B2}$ represents the time period from the completion of the image processing of the number of bands N for the in-advance paper feeding timing to the completion of the image processing of all the pieces of band data.

$$T_{B2} = (X-n)T_{Bk} \qquad \text{Expression (3)}$$

In Expression (3), X represents the number of bands of the paper P. Additionally, n represents the number of bands for the in-advance paper feeding timing (N is a maximum value of the n satisfying a condition). Further, $T_{Bk}$ represents a page load time period of one band.

Next, since Expression (4) is satisfied, $T_{V2}$ represents a distance from the paper feeding roller 42 to the resist position roller 44 divided by the linear velocity.

$$T_{V2} \approx T_{E1} \qquad \text{Expression (4)}$$

Next, since, as illustrated in FIG. 4, the completion of ejection of the paper P follows after the ejection time period of image data, which is equal to the vertical synchronization signal waiting time period $T_{V2}$+the ejection processing time period $T_{V3}$ of the image data. Thus, Expression (5) corresponding to Condition 1 is satisfied.

$$\text{Condition 1: } T_{V2} + T_{V3} < T_{E1} + T_{E2} \qquad \text{Expression (5)}$$

Next, since, as illustrated in FIG. 4, the image data ejection completion notice follows after the page load completion notice, Expression (6) corresponding to Condition 2 is satisfied.

$$\text{Condition 2: } T_{B2} < T_{V1} + T_{V2} + T_{V3} \qquad \text{Expression (6)}$$

If Expression (5) corresponding to Condition 1 and Expression (6) corresponding to Condition 2 are calculated with the following procedure, Expression (7) is satisfied. Accordingly, N, which represents the maximum value of the n that satisfies Expression (7) (in this regard, here, X being greater than or equal to N) becomes the number of bands for the in-advance paper feeding timing.

Condition 1 & Condition 2: $T_{B2} < T_{V1} + T_{V2} + T_{V3} < T_{E1} + T_{E2} + T_{V1}$ $\Rightarrow T_{B2} < T_V < T_E + T_{V1}$ $\Rightarrow (X-n)T_{Bk} < T_V < T_E + T_{V1}$ $\Rightarrow X - n < T_V/T_{Bk} < (T_E + T_{V1})/T_{Bk}$ $\Rightarrow n > X - (T_V/T_{Bk}) > X - (T_E + T_{V1})/T_{Bk}$    Expression (7)

The number of bands (N) for the in-advance paper feeding timing, calculated based on Expression (7), varies depending on the paper size such as B3, A4, B4, or A3 and the paper orientation. Therefore, the image forming apparatus 1 preliminarily calculates the number of bands (N) for the in-advance paper feeding timing and saves the number of bands (N) for the in-advance paper feeding timing in the storage unit 8. The value of N may depend on a paper size and orientation. The image forming apparatus may perform the calculation for various values of N for a number of different paper sizes and orientations and store the values of N in storage unit 8. When the user inputs a paper size and a paper orientation from the operation unit 5, the data processing unit 72 retrieves, from the storage unit 8, the number of bands (N) for the in-advance paper feeding timing that corresponds to the paper size and the paper orientation. Then, the data processing unit 72 outputs the in-advance paper feeding timing notice to the print control processing unit 71 at the time of completing the image process of the number of bands (N) for the in-advance paper feeding timing.

Accordingly, the print control processing unit 71 outputs, to the image processing unit 73, the image data ejection request with reference to the time of completion of the image process of the number of bands (N) for the in-advance paper feeding timing, and outputs the paper feeding request to the drive processing unit 74. Therefore, it is possible to cause the timing of the transport of the paper P by the paper feeding roller 42 and the timing of the ejection of image data to coincide with each other. From this, even when the primary paper feeding and the secondary paper feeding are caused to continuously operate, it is possible to perform paper feeding at an optimum timing. Furthermore, using the in-advance paper feeding timing, it is possible to reduce the first copy time even in the low-cost image forming apparatus 1 where it would otherwise be difficult to cause the paper P to stop at the position of the resist roller.

While various aspects and embodiments have been disclosed herein, other aspects and embodiments are possible. Other designs may be used in which the above-described components are each present.

In addition, while, in the description of the in-advance paper feeding timing calculation method of the embodiment, illustration is performed so that one paper feeding cassette is installed in the paper feeding unit 41 as illustrated in FIG. 2, this is an example, and it is possible to install, in the paper feeding unit 41, a plurality of paper feeding cassettes where paper sizes are different.

In addition, a procedure where the user inputs the paper size and the paper orientation from the operation unit 5 and makes a printing request has been described. However, without being limited to this, it is possible to apply the same in-advance paper feeding timing when a paper size, a paper orientation, and a print request are received from the peripheral device 11 connected to the network 10 or various kinds of devices connected to the Internet 13.

In addition, when a page whose paper size or paper orientation is different from that of other pages is mixed in a plurality of pages, it is possible for the image forming apparatus 1 to automatically detect the paper size and the paper orientation for each page and to adjust the in-advance paper feeding timing for each page.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image forming apparatus comprising:
    an operation unit that provides a paper size, a paper orientation, and a print request;
    a storage unit;
    a print control processing unit that (i) provides a request to start loading a page responsive to the operation unit providing a paper size, a paper orientation, and a print request, (ii) provides a request to eject image data in response to an in-advance paper feeding timing notice being provided by a unit of the image forming apparatus, and (iii) provides a paper feeding request in response to a completion notice of ejection preparation being provided by a unit of the image forming apparatus;
    a data processing unit that, responsive to the print control processing unit providing the request to start loading a page, (i) divides image data into pieces of band data, (ii) causes the storage unit to store the pieces of band data, (iii) calculates a number of specific bands corresponding to an in-advance paper feeding timing based on the paper size and the paper orientation, and (iv) provides the in-advance paper feeding timing notice to the print control processing unit when image processing is completed up to the number of specific bands;
    an image processing unit that, responsive to the print control processing unit providing the request to eject image data, (i) starts image data ejection preparation, (ii) provides a completion notice of ejection preparation for the image data to the print control processing unit in response to the image data ejection preparation being completed, (iii) retrieves pieces of band data saved in the storage unit, and (iv) generates image data based on the pieces of band data; and
    a drive processing unit that, responsive to the print control processing unit providing the paper feeding request, outputs to the image processing unit a vertical synchronization signal that causes a timing of transport of the paper by the paper feeding roller to coincide with a timing of ejection of image data,
    wherein the data processing unit further provides a completion notice of the page load to the print control processing unit,
    wherein the image processing unit further (i) starts ejecting image data based on the vertical synchronization signal when the drive processing unit inputs the vertical synchronization signal, and (ii) provides a completion notice of ejection of image data to the print control processing unit when ejection of image data is completed for all the pieces of band data, wherein the drive processing unit further provides a completion notice of ejection of a paper to the print control processing unit when the ejection roller completes ejection of the paper, wherein the print control processing unit further provides a print completion notice responsive to the data processing unit providing the completion notice of the page load, the image processing unit providing the completion notice of ejection of image data, and the drive processing unit providing the completion notice of ejection of the paper in turn, wherein the data processing unit further calculates the number of specific bands corresponding to the in-advance paper feeding timing, based on a first condition where a time obtained by adding a waiting time period of the vertical synchronization signal and an ejection processing time period of the image data to each other is shorter than a time obtained by adding a time period of a primary paper feeding and a time period of a secondary paper feeding to each other, and a second condition where a time period of image processing of the number of remaining bands obtained by subtracting the number of specific bands from the number of all bands of the image data is shorter than a time period from start of ejection preparation process of image data to completion of ejection process of image data in the image process, and wherein the number of specific bands corresponding to the in-advance paper feeding timing (N) represents a maximum value of n satisfying the following expression, $$n > X - (T_V/T_{Bk}) > X - (T_E + T_{V1})/T_{Bk} \text{ and } X \geq N, \text{ wherein}$$

X represents a number of bands of the paper, $T_V$ represents a time period from an image data ejection request to an image data ejection completion notice, $T_{Bk}$ represents a page load time period of one band, $T_E$ represents a distance from the paper feeding roller to the ejection roller divided by a linear velocity, and $T_{V1}$ represents a time period from inputting of the image data ejection request to outputting of the image data ejection preparation completion notice.

2. The image forming apparatus according to claim 1, wherein
the in-advance paper feeding timing is a timing obtained by adding a processing time period of ejection preparation for image data to one of a timing of outputting an in-advance paper feeding timing notice and a timing of a request to eject image data.

3. The image forming apparatus according to claim 1, further comprising:
a recording unit that transfers the image data onto the page based on the vertical synchronization signal.

4. The image forming apparatus according to claim 1, wherein the image forming apparatus continuously performs primary paper feeding in which paper is transported from a paper feeding roller to a resist position roller and secondary paper feeding in which the paper is transported from the resist position roller to an ejection roller while not stopping the resist position roller.

5. An image forming method performed by an image forming apparatus comprising:
providing a print request;
providing a request to start loading a page;
dividing image data into pieces of band data;
storing the pieces of band data;
calculating the number of specific bands corresponding to an in-advance paper feeding timing based on a size and an orientation of the paper;
providing an in-advance paper feeding timing notice when image processing is completed for the number of specific bands;
providing a request to eject image data;
starting ejecting preparation for image data;
providing a completion notice of ejection preparation for image data responsive to the ejection preparation for image data being completed;
retrieving pieces of saved band data;
generating image data based on the pieces of band data;
providing a paper feeding request;
providing a vertical synchronization signal that causes a timing of ejection of the paper by the paper feeding roller to coincide with a timing of ejection of image data;
providing a page load completion notice;
performing ejection of image data based on the vertical synchronization signal;
providing a completion notice of ejection of image data responsive to ejection of image data being completed for all the pieces of band data;
providing a paper ejection completion notice; and
providing a print completion notice,
wherein the number of specific bands corresponding to the in-advance paper feeding timing is calculated based on
a first condition where a time obtained by adding a waiting time period of the vertical synchronization signal and an ejection processing time period of the image data to each other is shorter than a time obtained by adding a time period of a primary paper feeding and a time period of a secondary paper feeding to each other, and
a second condition where a time period of image processing of the number of remaining bands obtained by subtracting the number of specific bands from the number of all bands of the image data is shorter than a time period from start of ejection preparation process of image data to completion of ejection process of image data in the image process, and
wherein the number of specific bands corresponding to the in-advance paper feeding timing (N) represents a maximum value of n satisfying the following expression, $$n > X - (T_V/T_{Bk}) > X - (T_E + T_{V1})/T_{Bk} \text{ and } X \geq N, \text{ wherein}$$

X represents a number of bands of the paper, $T_V$ represents a time period from the image data ejection request to the image data ejection completion notice, $T_{Bk}$ represents a page load time period of one band, $T_E$ represents a distance from the paper feeding roller to the ejection roller divided by a linear velocity, and $T_{V1}$ represents a time period from the inputting of the image data ejection request to the outputting of the image data ejection preparation completion notice.

6. The image forming method according to claim 5, wherein
the in-advance paper feeding timing is a timing obtained by adding a processing time period of ejection preparation for image data to one of a timing of outputting an in-advance paper feeding timing notice and a timing of a request to eject image data.

7. The image forming method according to claim 5, wherein the image data is scanned image data, and wherein the image forming method further comprises:
receiving a page of a manuscript that contains at one of text or images;
capturing an image of the received page; and determining the scanned image data from the captured image.

8. The image forming method according to claim 5, further comprising:
transferring the image data onto the page based on the vertical synchronization signal.

9. A non-transitory computer-readable medium having instructions stored thereon that, when executed by at least one processor of an image forming apparatus, performs the following functions:
providing a print request;
providing a request to start loading a page;
dividing image data into pieces of band data;
storing the pieces of band data;
calculating the number of specific bands corresponding to an in-advance paper feeding timing based on a size and an orientation of the paper;
providing an in-advance paper feeding timing notice when image processing is completed for the number of specific bands;
providing a request to eject image data;
starting ejecting preparation for image data;
providing a completion notice of ejection preparation for image data responsive to the ejection preparation for image data being completed;
retrieving pieces of saved band data;
generating image data based on the pieces of band data;
providing a paper feeding request;
providing a vertical synchronization signal that causes a timing of ejection of the paper by the paper feeding roller to coincide with a timing of ejection of image data;
providing a page load completion notice;
performing ejection of image data based on the vertical synchronization signal;
providing a completion notice of ejection of image data responsive to ejection of image data being completed for all the pieces of band data;
providing a paper ejection completion notice; and
providing a print completion notice,
wherein the number of specific bands corresponding to the in-advance paper feeding timing is calculated based on
a first condition where a time obtained by adding a waiting time period of the vertical synchronization signal and an ejection processing time period of the image data to each other is shorter than a time obtained by adding a time period of a primary paper feeding and a time period of a secondary paper feeding to each other, and
a second condition where a time period of image processing of the number of remaining bands obtained by subtracting the number of specific bands from the number of all bands of the image data is shorter than a time period from start of ejection preparation process of image data to completion of ejection process of image data in the image process, and
wherein the number of specific bands corresponding to the in-advance paper feeding timing (N) represents a maximum value of n satisfying the following expression, $$n > X - (T_V/T_{Bk}) > X - (T_E + T_{V1})/T_{Bk} \text{ and } X \geq N, \text{ wherein}$$

X represents a number of bands of the paper, $T_V$ represents a time period from the image data ejection request to the image data ejection completion notice, $T_{Bk}$ represents a page load time period of one band, $T_E$ represents a distance from the paper feeding roller to the ejection roller divided by a linear velocity, and $T_{V1}$ represents a time period from the inputting of the image data ejection request to the outputting of the image data ejection preparation completion notice.

10. The non-transitory computer-readable medium according to claim 9, wherein
the in-advance paper feeding timing is a timing obtained by adding a processing time period of ejection preparation for image data to one of a timing of outputting an in-advance paper feeding timing notice and a timing of a request to eject image data.

11. The non-transitory computer-readable medium according to claim 9, wherein the image data is scanned image data, and wherein the image forming method further comprises:
receiving a page of a manuscript that contains at one of text or images;
capturing an image of the received page; and
determining the scanned image data from the captured image.

* * * * *